INVENTORS
Frank B. Wilson
Wayne A. Watkins

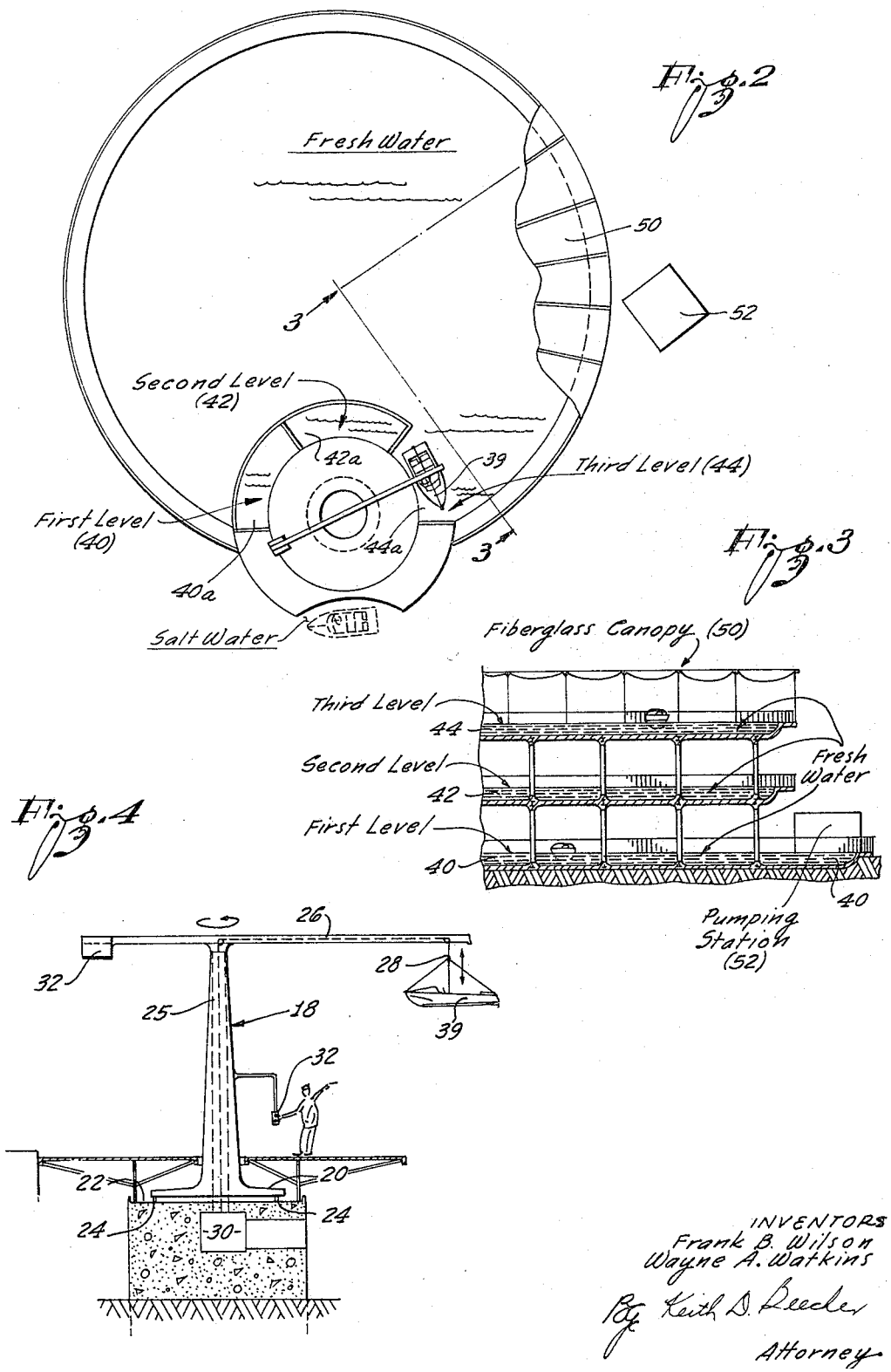

United States Patent Office 3,287,921
Patented Nov. 29, 1966

3,287,921
BOAT STORAGE SYSTEM
Frank B. Wilson, 1831 W. Lomita Blvd., Lomita, Calif., and Wayne A. Watkins, 1707 238th St., Torrance, Calif.
Filed Aug. 21, 1963, Ser. No. 303,541
4 Claims. (Cl. 61—63)

The present invention provides an improved system and structure for the convenient storage of boats and other water-going craft and vessels; and the invention is more particularly concerned with the provision of such an improved system and structure for providing fresh water storage for sea-going or salt-water vessels.

For many centuries, sea-going vessels have been subject to the problem of maintaining their bottoms free of the formation of marine crustaceans, such as barnacles. These crustaceans are known to grow in salt water on the ships' bottoms in great numbers. When growing in such a manner they foul a ship and reduce its speed materially. The removal of barnacles from the bottom of sea-going craft has long been an item of material expense.

The aforementioned marine crustaceans exist only in salt water, and it has long been known that the growth can be retarded to a material extent, if some means can be found for mooring the vessel in fresh water when it is in port, and is not in use. That is one reason, of course, for mariners, historically, to seek out rivers for berthing their vessels.

The improved storage system and structure of the present invention is intended to provide a convenient and economical fresh water storage for sea-going vessels, and the like; which enables the vessel to be removed from the salt water when not in use, and deposited in a fresh water depository, all in a convenient, simple and economical manner.

The use of the system and structure of the present invention, not only obviates the growth of barnacles and other marine crustaceans on the bottom of the vessel, but also the fresh water storage system of the present invention enables the salt-water circulating system, pumps, cooling system, and the like, of the vessels to be thoroughly flushed out by fresh water, when the vessel is so stored.

The system and structure of the invention is primarily intended to provide fresh water storage for vessels of the order of 30–40 feet in length. These vessels are of the type which normally cannot be removed conveniently from the ocean, or other body of water in which it is sailed, when the vessel is not in use.

It will become evident as the description proceeds, that the improved structure and system of the invention also has utility for providing storage for the smaller type of craft. This smaller type is usually hauled out of the water after each use, and is then moved back and forth between the home of the owner and the water.

The improved storage system of the present invention provides a convenient, economical and compact on-site storage for the craft, even of the smaller type. This precludes any need to load and unload the boat from a trailer, or to haul the trailer back and forth between the owner's residence and the water.

In the practice of the present invention, and particularly in the embodiment to be described, a multi-tiered structure is provided, and a tank-like water-filled storage means is provided on each tier in the structure. In accordance with the invention, the vessel to be stored is hoisted by a rotatable crane out of the adjacent water-way and into one of the fresh water storage tanks.

It is, accordingly, an object of the present invention to provide an improved fresh water storage system and structure for water craft; and particularly for water vessels, and the like, normally intended for salt water use.

Another object of the invention is to provide such an improved storage system and structure which is relatively compact and which can be constructed as a multi-story housing which is positioned adjacent the body of water in which the aforesaid vessels are to be sailed.

Yet another object of the invention is to provide such an improved system and structure which is simple and economical to operate and which is capable of rapidly transferring the vessels between the water-way and the fresh-water storage area.

Another problem, which is encountered when vessels are left at a usual open mooring, is the general contamination and deterioration of the vessels from the elements, such as from salt water corrosion, and also from the deposit of an oily airborne substance normally referred to as "fly ash." "Fly ash" is exuded into the surrounding atmosphere during the cleaning operation of oil burning vessels. Such vessels usually clean out their combustion systems by the discharge therein of live steam. This results in an oily substance being blown out of the stack of the vessels. This substance falls as a deposit on the adjacent craft and vessels, and the resulting oily deposit is most difficult to remove.

Yet another object of the invention is to provide an improved boat storage structure and system which is constructed so that it may be fully enclosed for the full protection of the stored vessels from the aforementioned "fly ash," from salt water corrosion, and from the elements in general.

A still further object of the invention is to provide such an improved boat storage system in which a relatively large number of vessels can be stored in a relatively small space without the need for individual "pigeon holes," or the like; and without the need for expensive and complicated machinery for shifting the craft to various stored positions within the structure.

Other objects and advantages of the invention will become apparent from a consideration of the following specification, when the specification is taken in conjunction with the accompanying drawings, in which:

FIGURE 2 is a top plan view of the boat storage system of FIGURE 1;

FIGURE 3 is a fragmentary sectional view, taken substantially on the line 3—3 of FIGURE 2; and FIGURE 4 is a side elevational view of a tower crane which is utilized in the embodiment of the invention to be described.

Figure 1:
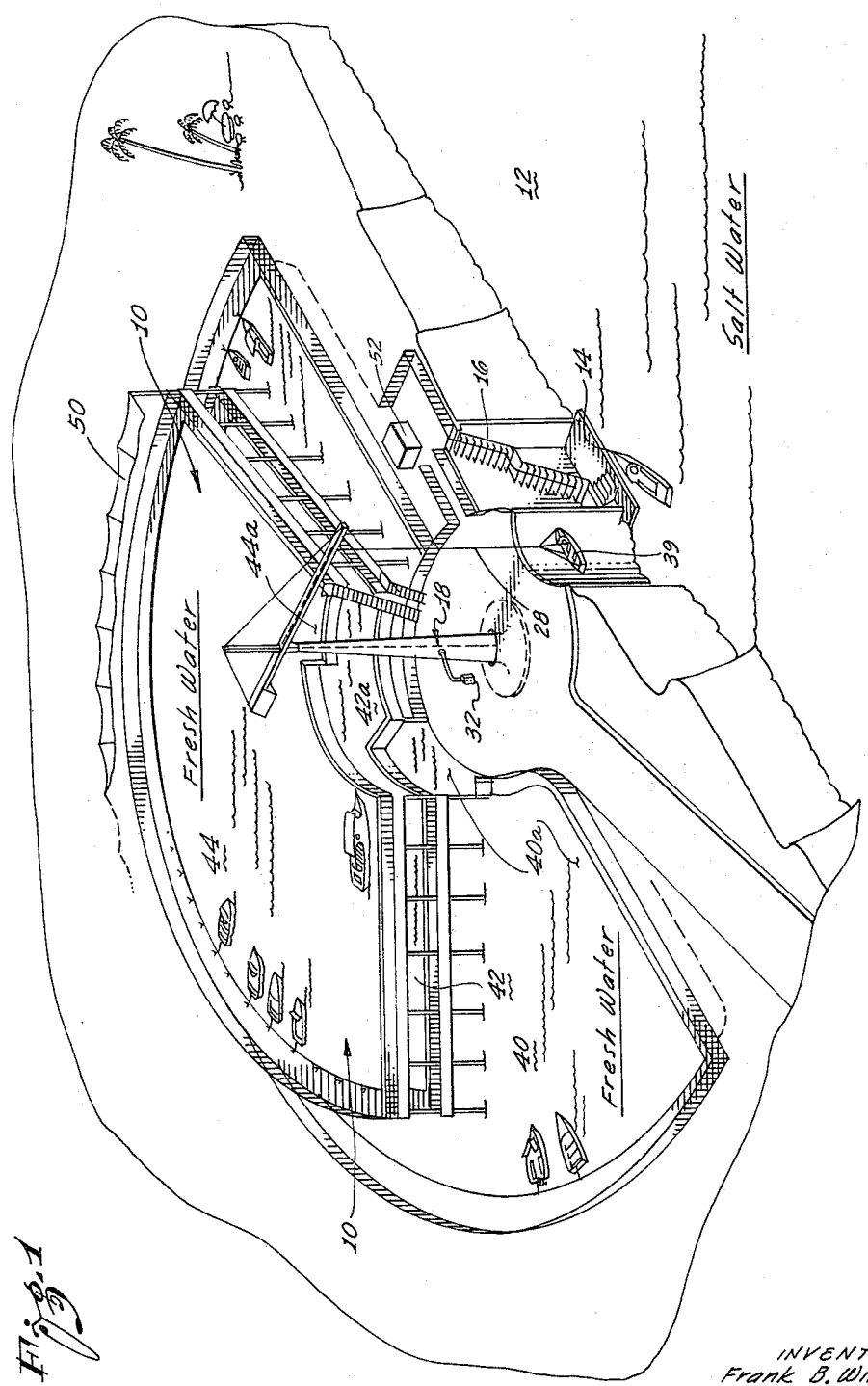
FIGURE 1 is a perspective view of a fresh water boat storage system constructed in accordance with one embodiment of the invention.

As shown in the accompanying drawings, the improved boat storage system of the present invention includes as one of the components thereof, a multi-tiered structure 10. The multi-tiered structure 10 may be constructed in accordance with known architectural principles, of concrete and aluminum, steel, or the like.

The structure is positioned adjacent a salt-water waterway 12, which, for example, extends to the ocean. A jetty 14 is provided, so that the vessels may be brought alongside, to enable the personnel to disembark. An appropriate ladder 16 is provided to permit access to a parking lot (not shown).

Also included as a component of the improved boat storage system of the invention is a tower crane 18. As best shown in FIGURE 4, the tower crane 18 includes a lower platform 20 which is rotatably mounted on a base 22 on appropriate rollers 24. A fixed boom 26 is mounted on the upper extremity of the central tower 25 of the crane 18. A suitable hoist 28 is supported on the boom 26 and extends down the central tower 25 of the crane 18.

An electric motor control for the crane, such as shown by the block 30, is provided; and this control includes suitable switches, such as the switches 32. The control is such as to cause the crane 18 to rotate on its rollers 24; or to cause the hoist 28 to be raised or lowered. A suitable counter weight 32 may be mounted on the boom 26, at the end thereof remote from the hoist 28.

The tower crane 18 is operated by the switches 32 to hoist a vessel, such as the illustrated vessel 39 out of the water-way 12, and to raise the vessel to an appropriate level. Then, by actuation of the control switches 32, the crane is caused to rotate, so that the vessel 40 may be deposited in accessible portions of the storage structure 10, which will be described.

As best shown in FIGURES 1, 2 and 3, each tier, or level, of the multi-tiered structure 10 is shaped as a tank-like storage means, each of which is filled with fresh water. As shown in FIGURE 3, for example, the ground level provides a first fresh water storage tank 40, the second level provides a second fresh water storage tank 42, and the third level provides a third fresh water storage tank 44.

The structure 10 is preferably constructed so that the storage tanks at the different levels extend across the entire level. The different vessels deposited by the crane 18 in the water storage tanks 40, 42 and 44 at the different levels may be conveniently moved to designated or selected storage positions in the levels, merely by towing them from place to place. This towing may be done manually by an attendant moving about in the water. This obviates any need for separate pigeon holes for the different vessels, or for complicated machinery for moving the vessels to various storage positions at the different levels.

As best shown in FIGURES 1 and 2, each storage level includes a portion which extends horizontally outwardly to be accessible from the exterior of the structure 10 and from above the structure. For example, the third level includes an externally accessible portion 44a, the second level includes an externally accessible portion 42a, the ground, or first, level includes an externally accessible portion 40a.

Therefore, in the operation of the system, it is merely necessary for the tower crane 18 to deposit the vessel 40 in any one of the three accessible portions 40a, 42a, or 44a. When so deposited, the vessel, in the fresh water in that level, can be removed from the crane by the attendant, and then moved by him in the water to a selected mooring position in the level.

In order to protect the vessels stored in the structure 10 from "fly ash," and from the elements; a canopy 50 is provided which extends across the upper level 44 to cover the entire top of the structure. Appropriate drop curtains can also be provided which extend down over the sides of the structure, so as to provide a completely protected enclosure. The canopy and side curtains may be formed of fiber glass, or any other appropriate substance.

An appropriate pumping station 52 is provided, at any convenient location, to pump the fresh water to the different levels 40, 42 and 44, and to maintain the fresh water circulating through an appropriate filtering system. In this manner, the various vessels can flush out their salt water systems while in storage, and be assured that fresh uncontaminated water will be available to circulate through the systems.

The invention provides, therefore, an improved boat storage system. The boat storage system of the invention is advantageous in that it may be constructed in a relatively simple manner, and in that it is conceived to utilize a minimum of components so as to provide for the adequate and compact on-site storage for the vessel.

The invention is particularly advantageous in that it provides a convenient fresh water storage means for the vessel, in conjunction with an improved mechanism, which provides for the rapid and economical transfer of vessels between the water-way and the storage structure.

While a particular embodiment of the invention has been shown and described, modifications may be made. For example, the housing 10 is illustrated in FIGURE 1 as being in the form of a segment of a circle. However, if so desired, the structure may be constructed to comprise the entire circle, with the tower crane 18 in the center. The water-way 12 would then extend under the housing to a central point, at which the crane is in position to transfer the vessels between the water-way and the structure.

It is intended in the claims to cover all embodiments which fall within the spirit and scope of the invention.

What is claimed is:

1. A boat storage system and structure including: a housing positioned adjacent a body of salt water; at least one tank-like storage means in said housing, said tank-like storage means being isolated from said body of salt water and being intended to hold fresh water and having a portion accessible from the exterior of said housing; fresh water in said storage means; means for introducing such fresh water into said storage means from a source independent of said body of water; and means adjacent said housing for hoisting vessels out of said body of water and for depositing the same into said accessible portion of said tank-like storage means to be floated on said fluid in said storage means.

2. The boat storage system defined in claim 1, in which said hoisting means comprises a rotatable crane mounted adjacent said housing for hoisting vessels out of said body of salt water and for depositing the same into said accessible portion of said tank-like storage means.

3. A boat storing system and structure including: a multi-tiered housing positioned adjacent a salt water-way; a plurality of tank-like fresh water storage means respectively mounted on corresponding ones of the tiers of said housing, each of said tank-like storage means being isolated from said body of salt water and being intended to hold fresh water, each of said storage means having a portion extending outwardly from said housing to be externally accessible from above said housing; fresh water in said storage means; pumping means for introducing such fresh water into each of said storage means from a source independent of said body of water; and a rotatable crane mounted adjacent said housing for hoisting vessels out of said water-way and for depositing the same selectively into said accessible portions of said fresh water storage means; said crane having an extension extending over the aforesaid outwardly extending portion of each of said storage means.

4. The boat storage system and structure defined in claim 3 and which includes a canopy extending over the upper one of said tiers.

References Cited by the Examiner
UNITED STATES PATENTS

| | | | |
|---|---|---|---|
| 2,687,814 | 8/1954 | Romick | 61—65 |
| 2,860,488 | 11/1958 | Johnson | 61—21 |
| 3,082,887 | 3/1963 | Brooks | 214—16.42 |

CHARLES E. O'CONNELL, *Primary Examiner.*

JACOB SHAPIRO, *Examiner.*